Patented Nov. 21, 1950

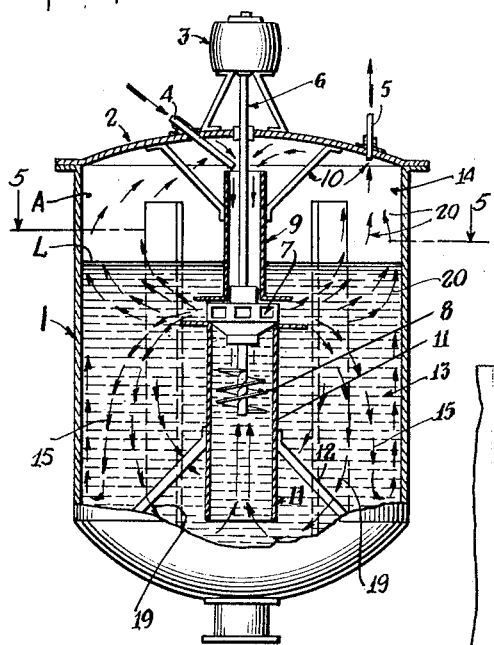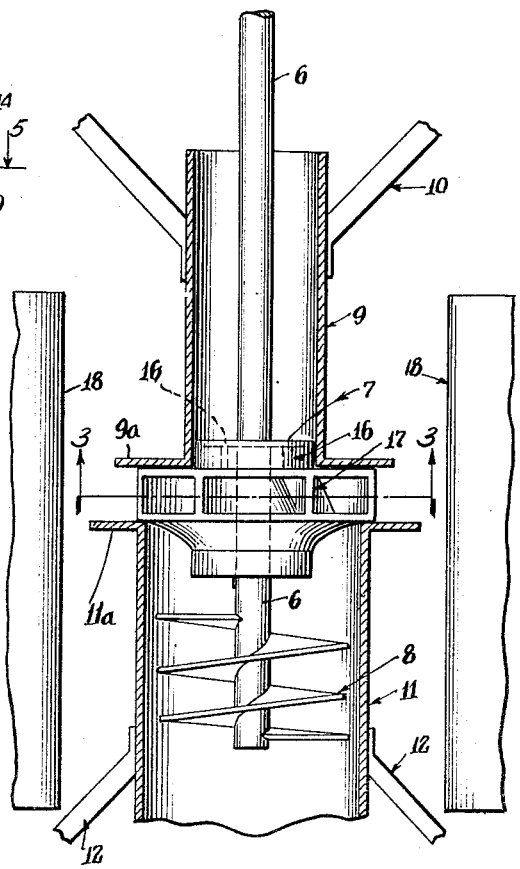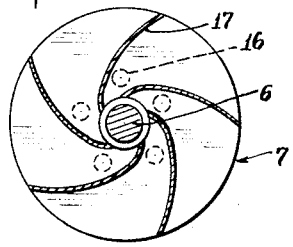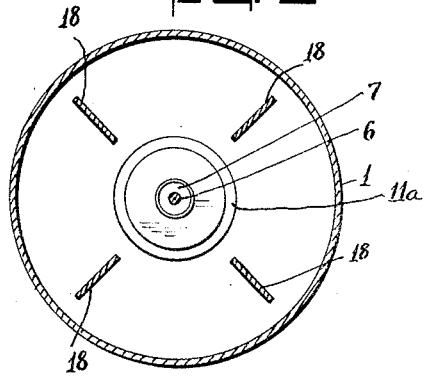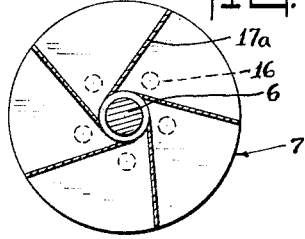

2,530,814

UNITED STATES PATENT OFFICE 2,530,814

APPARATUS FOR AERATING LIQUIDS

George de Becze and Alfred J. Liebmann, Cincinnati, Ohio, assignors to Schenley Industries, Inc., a corporation of Delaware Application October 12, 1945, Serial No. 621,956

3 Claims. (Cl. 261—93)

Our invention relates to a new and improved method and new and improved apparatus for aerating liquids for the purpose of producing biochemical changes, including fermentation, microbiological oxidation or other microbiological processes, hydrolysis, production of antibiotic substances which include penicillin, and propagating microorganisms.

One object of our invention is to aerate the liquid medium by finely distributed gas bubbles which may be air, oxygen, inert gases such as carbon dioxide, and gases and mixture of gases of every kind.

It is well known that when certain microorganisms are propagated in a liquid culture medium, for biochemical purposes, that biochemical activity is greatly accelerated when the nutrient liquid is aerated. While air or oxygen is usually employed as the aerating agent, inert gases such as carbon dioxide, are useful in many cases. Aeration helps the growth of the microorganism and its enzyme activity.

It is also well known that it is desirable to apply the gas or mixture of gases in very fine bubbles.

According to our invention, we provide an improved mechanical system for aerating the liquid culture medium or liquid nutrient.

The most successful processes of this type are disclosed in Hungarian Patent No. 110,202 (1934) and Austrian Patent No. 42,217 (1935).

Our invention is illustrated with reference to the aeration of a liquid medium by means of air.

According to our invention, air is sucked from the air phase of the fermenting tank by means of equipment which is rotated at suitable high speed, under the surface of the liquid in the fermenting tank. The air is mixed with the liquid, below the surface of the liquid. The liquid in the fermenting tank is circulated so that the smallest bubbles remain in the liquid, during a much longer period than the larger bubbles.

Numerous additional objects and advantages of our invention will be disclosed in the annexed description and drawings which disclose an illustrative embodiment thereof.

Fig. 1 is a vertical sectional view, partially in vertical elevation, of a fermenter or fermenting tank which is provided with the improved system.

Fig. 2 is a detail vertical sectional view, partially in elevation, which illustrates the impeller and certain auxiliary parts.

Fig. 3 is a detail sectional view on the line 3—3 of Fig. 2, showing only the shapes of the impeller blades and the circle which joins their tips, and the locations of the vertical bores in the top end-wall of the impeller.

Fig. 4 is a view similar to Fig. 3, which shows modified impeller blades. In Fig. 4, the impeller blades are straight and in Fig. 3 each impeller blade has the contour of a cycloid.

Fig. 5 is a horizontal sectional view along line 5—5 in Figure 1 of the fermenting tank which shows the baffle plates.

The invention is shown as applied to a fermenting tank 1, which has a cover 2, which fits air-tight and gas-tight against the top of the fermenting tank 1, in order to seal said fermenting tank 1, with the exception of the inlet tube 4 and the outlet tube 5. Air is drawn into the tank 1 through the tube 4 and it is expelled from the tank 1 through the outlet tube 5.

A motor 3 is fixed to the cover 2. Said motor 3 has a shaft 6 which extends air-tight and gas-tight through the cover 2. For convenience, the shaft 6 is shown as being in the vertical position. The top level of the pool 13 of the liquid nutrient medium or culture medium in the tank 1, is indicated by the reference letter L.

The air inlet tube 4 and the air outlet tube 5 are fixed to the cover 2, and they fit air-tight and gas-tight in suitable bores of the cover 2.

The lower or inner end of the air inlet tube 4 communicates with the outer or upper end of an air-conducting tube 9, which is fixed to the cover 2 by means of arms 10.

As shown in Fig. 2, the lower end of the air-conducting tube 9 has an enlarged flange 9a.

The impeller 7 is fixed to the shaft 6, so that the impeller 7 rotates in unison with the shaft 6. As shown in detail in Fig. 2, the upper end-wall of the impeller 7 is located in the lower end-portion of the air-conducting tube 9. This upper end-wall of the impeller 7 is provided with a series of vertical through-and-through bores 16, which provide air holes for the downward passage through said end-wall of the air which enters and passes downwardly through the air-conducting tube 9.

As shown in Fig. 2, said upper end-wall of impeller 7 fits closely in the lower end-portion of tube 9. The air-currents which flow through bores 16 are rotated in said bores 16 about the axis of shaft 6.

A liquid-conducting tube 11 is located below the air-conducting tube 9. At its top, said liquid-conducting tube 11 has a flange 11a.

Intermediate the flanges 9a and 11a, the impeller 7 is provided with a series of blades 17 or 17a.

Below the flange 11a, a screw rotor 8 of the usual helical shape is fixed to the shaft 6.

The liquid-conducting tube 11 is fixed to the inner wall of the tank 1, by means of arms 12.

Vertical baffle plates 18 are provided in the interior of the tank 1. As shown in Fig. 5, these baffle plates 18 are arranged radially, relative to the vertical axis of rotation of the shaft 6. The planes of these baffle plates 18 intersect said vertical axis of rotation of shaft 6. Said baffle plates 18 are arranged in aligned pairs, each said pair being located in the same perpendicular plane. The vertical plane of one said pair is perpendicular to the vertical plane of the other pair.

The bottoms of these baffle plates 18 are fixed to the bottom wall of the tank 1.

In Fig. 3, each impeller blade has the contour of a cycloid. In Fig. 4, each modified impeller blade 17a is straight.

The operation of the system is as follows:

The shaft 6 is rotated at any desired speed, such as 1,000–3,000 revolutions per minute. The blades 17 or 17a of the impeller are preferably closer to the top level L of the pool of liquid 13, than to its bottom level. For example, the distance of the submerged impeller blades 17 or 17a from the top level L, may be 25% or less of the total height of the pool of liquid 13. As one example, the height of the liquid pool 13 may be 20 feet, and the distance of the impeller blades 17 or 17a below the top level L is about 1 foot. As another example, if penicillin is to be produced by means of *Penicillium notatum*, the height of the liquid pool 13 may be 4 feet, so that the distance of the impeller blades 17 or 17a below the top level L is about 1 foot.

In each case, this applies to the distance between the top of each impeller blade 17 or 17a and the line L, and the height of the impeller blades is about 1 inch to 2 inches, depending on the size of the fermenter 1, the speed of rotation of shaft 6, and the diameter of the impeller.

The baffle plates 18 prevent the liquid from rotating in the annular space between the air-conducting tube 11 and the vertical inner wall of the fermenting tank 1.

The helical rotor 8 upwardly forces the liquid of the pool 13 through the liquid-conducting tube 11, since the bottom end of such tube is open and it is spaced from the bottom wall of the tank 1. This upwardly forced moving column of liquid is forced laterally at and above flange 11a, by the rapidly revolving impeller blades 17 or 17a. The liquid is thus circulated in a plurality of closed paths, as indicated by the lines 19. This lateral movement of the liquid between flanges 9a and 11a creates a suction at the lower end of the tube 9, so that air is forced downwardly through said tube 9, as indicated by the arrows in Fig. 1. The air passes vertically downwardly through the bores 16 of the impeller 7. The diameter of each bore 16 may be 0.25 inch to 0.50 inch. As above noted, the air-currents which pass downwardly through bores 16 are also given a rotary movement around the axis of shaft 6. The downwardly moving air thus enters the spaces between the respective impeller blades, where the air is energetically mixed with the upwardly and laterally moving liquid which is located in said spaces, thus producing fine air bubbles. These air bubbles are laterally impelled in unison with the laterally moving liquid. The larger bubbles will be impelled in the direction of the lines 20, so that they will rise to the air space A. The air in said air space A will also be continuously drawn downwardly through the tube 9, at the top of said tube 9. The medium-sized bubbles will be drawn downwardly by the downwardly moving mass of liquid in the annular space between the tube 11 and the inner vertical wall of the tank 1, as illustrated by the lines 15. Such medium-sized bubbles will then rise through substantially the entire height of the pool of liquid 13, to pass into the air space A. The very fine bubbles will follow the movement of the liquid downwardly to below the bottom of the tube 11, and then upwardly through said tube 11, in unison with the circulating liquid, as illustrated by the lines 19.

The major part of the air which is thus forced into the pool of liquid 13, will thus be distributed in the form of very fine bubbles, which pass downwardly through substantially the entire height of the pool of liquid 13. The bottom of the tube 11 is located as close as possible to the bottom of the pool of liquid 13, while providing sufficient space for the admission of liquid into the tube 11 at its open bottom.

We thus provide a method whereby the large air bubbles leave the pool of liquid after a short time, while the smaller air bubbles are forced through the entire height or substantially the entire height of the pool of liquid.

The amount of energy which is required to force a given mass of air into a pool of liquid 13, at the bottom of said pool, is much greater than if the air is introduced into the pool of liquid close to its top. It is not economical to force large bubbles of air into the pool, at the bottom thereof. Therefore, our method utilizes much less energy than if it were necessary to force the air into the pool of liquid 13 at its bottom or close to its bottom.

Therefore, our method does not require the use of air compressors, coolers and air lines which are external to the fermenter 1. Likewise, according to our method, we can readily filter the air which enters the apparatus through the tube 4, thus preventing contamination.

Our invention is not limited to a system whereby all the air which is required for a given fermentation process is introduced by the above-mentioned mechanism. In many systems, it is necessary to supply large volumes of fresh air, for replacing the oxygen which has been consumed in the fermentation process. In other cases, it is necessary to introduce relatively large volumes of fresh air, in order to reduce the concentration of carbon dioxide and other inert gases. Therefore, any supplemental system for introducing air may be used, while aerating the liquid according to our method.

The number of baffle plates 18 may be varied, depending upon the size of the fermenting tank 1.

The liquid is thus circulated in a plurality of closed paths, one of said paths being represented by a line 19. Said closed paths have a common selected axis, namely, the axis of tube 11. Said closed paths diverge laterally from said axis. In this example, said closed paths diverge from said axis at its upper end. Said closed paths converge laterally to said axis at the other ends thereof. Each closed path is located wholly within the pool 13. Even if said closed paths extend to the inner wall of tank 1, such closed paths are still wholly within said pool 13.

Moving gas is fed to said circulating liquid at a part of said closed paths. In this example, the gas is supplied in the laterally diverging components of said paths. Instead of relying wholly on the suction effect to supply gas to the circulating liquid, gas may be supplied from any suitable source, under any desired pressure.

The finest bubbles of gas follow the liquid throughout in its circulation. The medium size bubbles leave the circulating liquid, after such bubbles have traveled with the circulating liquid to some extent. The largest bubbles leave the circulating liquid, substantially at said lateral diverging components of said paths.

The use of the air space A, and many other features described herein, is optional.

The velocity at which the liquid is circulated, is sufficient to entrain at least some of the gas, to move with said circulating liquid.

By suitably shaping the tank 1, the liquid of its pool can be circulated through said pool in a single closed path, so that the invention is not limited to the use of a plurality of closed circulating paths.

It is noted that at least some of the gas, in path 15 or path 19, is entrained by the circulating liquid, so that at least some of the supplied gas moves with said liquid, in a change of direction from the part of said path where the gas is supplied. On the other hand, the bubbles which move in paths 20, merely move laterally away from the part of the path of the circulating liquid where the gas is supplied, and then upwardly.

Hence the bubbles which move in a path or paths 15 and/or 19, move with the circulating liquid in said path or paths 15 and/or 19, in a change of direction from the supply part of the respective path, at which gas is supplied to the circulating liquid. In contrast, the large bubbles which move in a path or paths 20, do not move with the circulating liquid in a change of direction from the supply part of the respective diverging component of the respective path, because such large bubbles leave the circulating liquid anterior a change of direction from the supply part of the respective path. Hence, since the gas is supplied to the circulating liquid at the point where the respective closed path or paths of circulation has diverging components, we include a method or apparatus in which the gas bubbles move downwardly with the circulating liquid through any distance from the top diverging components, in this example. However, for best results, at least some of the gas bubbles should be forced to move through the entire height of the pool of liquid, in order to secure maximum aeration.

The upwardly moving bubbles of gas which enter the air-space A, can escape through outlet-pipe 15.

Hence, during the operation of the system, gas is continuously withdrawn from the gas-space A into the liquid, and gas is also continuously discharged from the liquid into the gas-space A.

In order to maintain a substantially constant pressure in gas-space A, if the apparatus has such gas space, additional gas is supplied through tube 4, in order to compensate for any gas which is used in the respective biochemical process, and to compensate for any gas which is discharged through tube 5. The volume of the gas-space A may have any desired ratio to the volume of the liquid pool 13.

The agitation and aeration which are thus produced, are particularly flavorable for submerged-culture technique, in which the microorganism is propagated under the top line L of pool 13, and said micro-organism effects the desired reaction under said top line L. When an inoculum is added to the liquid culture medium 13, such inoculum is immediately thoroughly and uniformly intermixed with the culture medium, and such vigorous mixing and aeration can be maintained during the entire fermentation or other biochemical change. The system is applicable for any purpose in which it is desired to agitate and aerate a pool of liquid of any kind, so that the scope of the invention is not limited to any specific purpose or purposes, although it has unique utility in biochemical reactions.

The tank 1 and its contents can be kept at any desired temperature by applying any heating or cooling medium to the external wall of said tank, as by a conventional jacket through which a heating medium or a cooling medium can be forced or circulated, or by passing such heating or cooling medium through one or more pipes which are located internally in tank 1, so as to contact with the pool 13.

As an example, if the micro-organism is *Penicillium notatum* which is used to produce penicillin, the height of the pool may be 25 feet, and the fermenter 1 may be cylindrical with a horizontal circular cross-section whose area is substantially 4 feet, so that the total volume of the pool 13 of liquid nutrient is about 2300 gallons. The height of gas space A may be 8 feet. The motor 3 can be of 8 horse power, for revolving the shaft 6 at 2200 revolutions per minute. The temperature of the nutrient may be kept at 25° C., by providing the fermenter 1 with an external cooling jacket at its lower end, or by any suitable means.

The invention is not limited to the use of a fermenting tank 1 which has a cover. Said cover may be omitted, so that the tank 1 communicates freely at its top with the external atmosphere. In such case, the entire aerating system may be connected to any suitable support, in place of the cover 2.

The aerating system may be vertically movable relative to the top of the pool 13, so that said aerating system may be raised or lowered in order to compensate for changes in the top level L of said pool 13, which may occur in certain aerobic biochemical processes.

Numerous changes and omissions and additions can be made in and to the disclosure, herein, without departing from the scope of our invention.

We claim:

1. Apparatus for supplying gas in the form of bubbles to a pool of liquid, comprising a tank which has an upstanding peripheral wall and which is adapted to hold said pool, an upstanding and longitudinal liquid-conducting tube located in said tank, the bottom of said liquid-conducting tube being located above the bottom of said tank, said liquid-conducting tube having upper and lower open ends, a gas-conducting tube located in said tank above said liquid-conducting tube, said tubes having adjacent alined ends which are spaced from each other, the lower end of said gas-conducting tube being open, a shaft which has a lower shaft part located in said liquid-conducting tube and an upper shaft part located in said gas-conducting tube, said shaft being rotatable about its longitudinal axis, an impeller fixed to said shaft, said impeller having an end-wall which is located in said gas-conducting tube, a screw rotor which is fixed to said lower shaft part and which is shaped to force liquid upwardly through said liquid-conducting tube, said impeller also comprising blades which are located in the space between said adjacent ends and which are shaped to rotate said upwardly forced liquid in said space and to impel said rotating liquid away from said shaft in a direction substantially perpendicular to said shaft, said tank having a cover at the top thereof, said cover having a gas inlet and a gas outlet, said end-wall having through-and-through longitudinal bores which are located between said blades.

2. Apparatus according to claim 1, in which said gas inlet is a gas-flow tube whose lower end communicates directly with said gas-conducting tube so that gas which flows through said gas-flow tube flows directly into said gas-conducting tube.

3. Apparatus according to claim 1, in which said tank has fixed baffle means located in a lateral zone which is located between said upstanding peripheral wall and said liquid-conducting tube, said baffle means being constructed and operative substantially to stop the rotation of said liquid in said zone.

GEORGE DE BECZE.
ALFRED J. LIEBMANN.

REFERENCES CITED

The following references are of record in the file of this patent:

UNITED STATES PATENTS

| Number | Name | Date |
|---|---|---|
| 954,951 | Furowicz | Apr. 12, 1910 |
| 1,242,445 | Ittner | Oct. 9, 1917 |
| 1,417,895 | Fahrenwald | May 30, 1922 |
| 1,526,596 | Greenawalt | Feb. 17, 1925 |
| 1,771,321 | Snow | July 22, 1930 |
| 2,072,944 | Durdin, 3rd | Mar. 9, 1937 |
| 2,148,446 | Drake | Feb. 28, 1939 |
| 2,165,889 | Fischer et al. | July 11, 1939 |

FOREIGN PATENTS

| Number | Country | Date |
|---|---|---|
| 109,577 | Australia | Jan. 25, 1940 |